(12) United States Patent
Wakiyama et al.

(10) Patent No.: US 6,667,764 B1
(45) Date of Patent: Dec. 23, 2003

(54) VIDEO CAMERA APPARATUS AND VIDEO MONITOR SYSTEM

(75) Inventors: Koji Wakiyama, Yokohama (JP); Kazutaka Higuchi, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/329,309

(22) Filed: Jun. 10, 1999

(30) Foreign Application Priority Data

Jul. 9, 1998 (JP) .......................... 10-194639

(51) Int. Cl.⁷ .................. H04N 5/225; H04N 5/228; H04N 5/232
(52) U.S. Cl. .................. 348/211; 348/207; 348/208
(58) Field of Search ............... 348/143, 154, 348/155, 208.12, 208.14, 208.16, 211.6, 211.8, 211.99, 187

(56) References Cited

U.S. PATENT DOCUMENTS

| | | | |
|---|---|---|---|
| 4,566,036 A | | 1/1986 | Kadosawa |
| 4,945,417 A | * | 7/1990 | Elberbaum .................. 358/210 |
| 5,963,250 A | * | 10/1999 | Parker et al. ............... 348/211 |
| 6,483,539 B1 | * | 11/2002 | Yamagishi .................. 348/213 |

FOREIGN PATENT DOCUMENTS

| | | |
|---|---|---|
| DE | 4135385 A | 5/1992 |
| EP | 0737005 A | 10/1996 |
| EP | 0827349 A | 3/1998 |
| JP | 9-134216 | 5/1997 |
| JP | 9-297693 | 11/1997 |

* cited by examiner

Primary Examiner—Wendy R. Garber
Assistant Examiner—Catherine J. Toppin
(74) Attorney, Agent, or Firm—Connolly Bove Lodge & Hutz LLP

(57) ABSTRACT

A video camera apparatus effects one of predetermined operations regarding a video camera, generates historic data indicative of one of predetermined operations and stores tie historic data in a non-volatile memory, and reads the historic data from the non-volatile memory and outputs the historic data in response to a data reading request. A counter responsive counts the number of times of the present operations which is also stored as the historic data every predetermined interval. As historic data, an interval of the present operation, accumulates times interval of present operation, the detected trouble data, a count of troubles, the latest trouble, communication data communicating with an external controller, a temperature or a humidity are stored. A video monitoring system includes the video camera.

10 Claims, 5 Drawing Sheets

VIDEO CAMERA APPARATUS AND VIDEO MONITOR SYSTEM

BACKGROUND OF THE INVENTION

1. Field of the Invention

This invention relates to a video camera apparatus for taking an image and generating a video signal from the image and a video monitor system including the same.

2. Description of the Prior Art

A video monitor system including a monitor site including a display monitor and a video camera site remote from the monitor site, the video camera site including a video camera unit for receiving an image around the video camera unit and generating transmitting the video signal to the video monitor site, is known.

On the other hand, Japanese patent application provisional publication No. 9-134216 discloses a camera including a shock detector, a clock, and a memory for storing data of the shock (damage) and the date data. Moreover, Japanese patent application provisional publication No. 9-297693 discloses a video camera which detects a trouble thereof and generates trouble analysis data and transmits it to a center where a monitoring person monitors the condition of the video camera, or home use electric apparatus such as an electric refrigerator.

SUMMARY OF THE INVENTION

The aim of the present invention is to provide a superior video camera apparatus and a superior video monitor system.

According to the present invention there is provided a video camera apparatus including: an imaging unit for imaging an image around the video camera apparatus and generating and outputting a video signal from the image; an operation portion responsive to a command signal for effecting one of predetermined operations regarding the imaging unit; a historic data generating portion responsive to the operation portion for generating historic data indicative of one of predetermined operations; a non-volatile memory; a memory control portion responsive to the historic data generating portion for storing the historic data in the non-volatile memory; and a data outputting portion for reading the historic data from the non-volatile memory and outputting the historic data in response to a data reading request.

The video camera apparatus may further include: a power-on detector for detecting turning on of a power supply for the video camera apparatus, wherein the historic data generating portion starts generating the historic data in response to the power on detector and the memory control portion stores the historic data in response to the power-on detector.

The video camera apparatus may further include: a preset operation data storing portion for storing preset operation data, the operation portion effects a preset operation in accordance with the preset operation data as one of predetermined operations; and a counter responsive to the operation portion for counting the number of times of the preset operations, wherein the memory control portion stores the result of the counter as the historic data.

The video camera apparatus may further include a timer, wherein the memory control portion stores the result of the counter every predetermined interval as a total in response to the timer.

The video camera apparatus may further include: a preset operation data storing portion for storing preset operation data, the operation portion effects a preset operation in accordance with the preset operation data as one of predetermined operations; and a time measuring circuit for measuring an interval of the preset operation, wherein the memory control portion stores the result of the time measuring circuit as the historic data.

The video camera apparatus may further include: a timer for measuring a predetermined interval, wherein the memory control portion stores the result of the time measuring circuit for every predetermined interval as a total.

The video camera apparatus may further include: a trouble item data storing portion for storing a plurality of trouble item data; a trouble detecting portion for detecting a trouble occurring with one of predetermined operations effected by the operation portion; a judging portion for Judging which one of the trouble item data corresponds to the trouble, wherein the memory control portion stores data of the trouble every trouble item data in accordance with the Judging result of judging portion. In this case, the video camera apparatus may further include a counter for counting the number of times of occurrence of the trouble and a latest trouble detecting portion responsive to the trouble detecting portion for detecting the latest trouble, wherein the memory control portion stores data of the number of times of the troubles and data of the latest trouble.

The video camera apparatus may further include a mechanical moving portion and a limit detection circuit for detecting when the mechanical moving portion reaches a limit; a counter for counting the number of times the mechanical moving portion reaches the limit; a timer for measuring a predetermined interval, wherein the memory control portion stores data of the number of times the predetermined interval occurs.

The video camera apparatus may further include a communicating circuit for communicating with an external controller, wherein the memory control portion stores data regarding communicating with the external controller as the historic data.

The video camera apparatus may further include a temperature measuring circuit for measuring a temperature inside the video camera apparatus and a humidity measuring circuit for measuring a humidity inside the video camera apparatus, wherein the memory control portion stores the temperature and humidity as the historic data.

According to this invention there is provided a video monitor system including: a video camera unit including an imaging unit for imaging an image around the video camera apparatus and generating and outputting a video signal from the image, an operation portion responsive to a command signal for effecting one of predetermined operations regarding the imaging unit, a historic data generating portion responsive to the operation portion for generating historic data indicative of one of predetermined operations, a non-volatile memory; a memory control portion responsive to the historic data generating portion for storing the historic data in the non-volatile memory, and a data outputting portion for reading the historic data from the non-volatile memory and transmitting the historic data in response to a data reading request; and a monitor site including a display monitor for displaying the image in response to the video signal, a data request portion for transmitting a request for transmitting the historic data, a data receiving portion for receiving the historic data from the video camera unit, and a data display for displaying the historic data from the data receiving portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
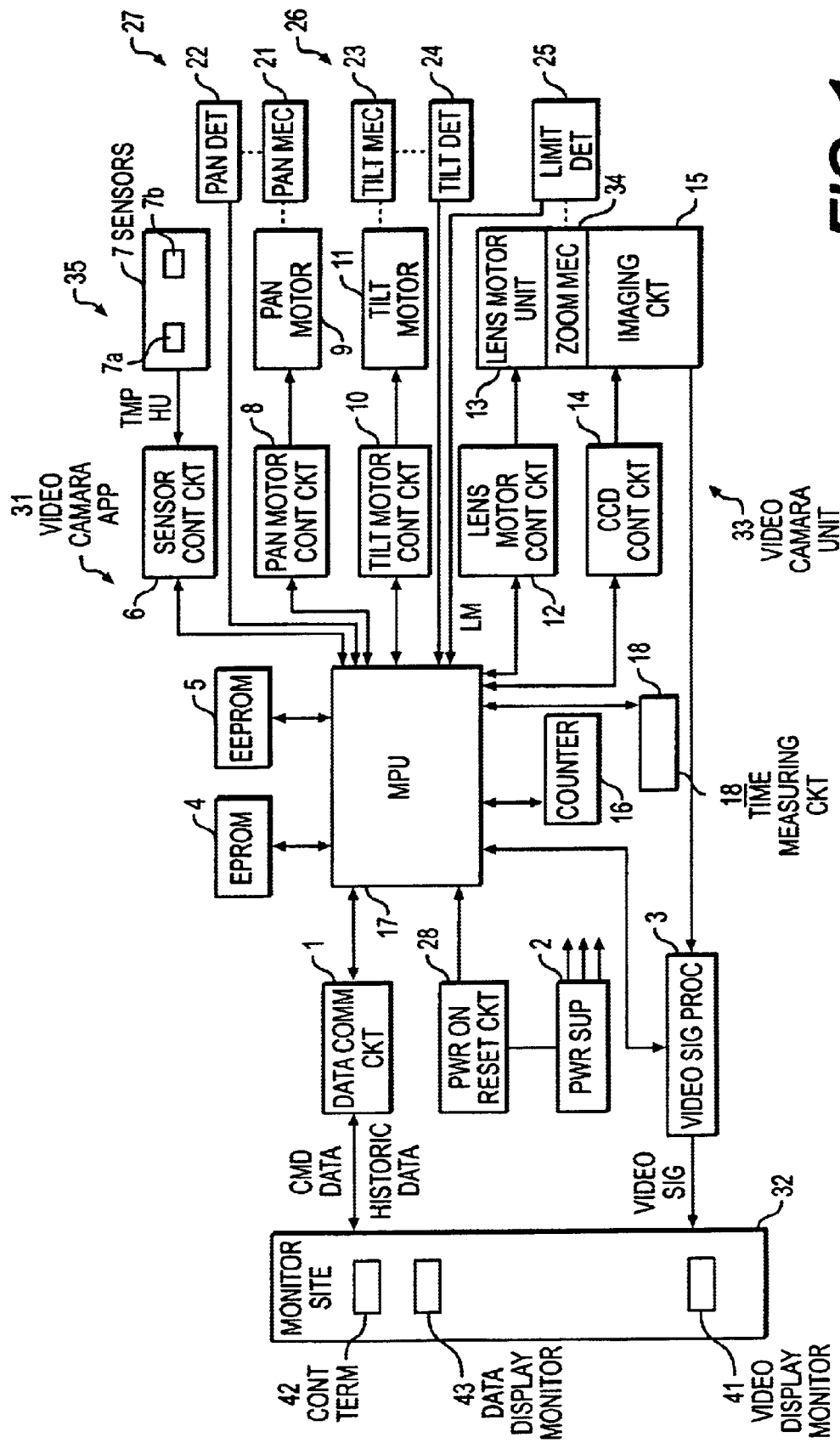
FIG. 1 is a block diagram a video monitor system including a video camera apparatus of this invention.

FIG. 1 is a block diagram of a video monitor system including a video camera apparatus.

The video monitor system includes a video camera apparatus 31 and a monitor site 32.

The video camera apparatus includes a microprocessor 17 for controlling respective circuits of the video camera apparatus 31, an EPROM (Electrically programmable read-only memory) 4 for storing programs for predetermined operations, an EEPROM (Electrically erasable programmable read-only memory) 5 for storing data, such as historic data, a data communication circuit 1 for communicating with the monitor site 32 through a cable or a network, a power supply 2 for supplying powers to respective circuits of the video camera apparatus 31, a power-on reset circuit 28 for detecting turning on of the power to inform the microprocessor 17 of the power on, a video camera unit 33 for receiving an image around the video camera apparatus 31 and generates an image signal, a video signal processor 3 for processing the image signal from the imaging circuit 15 to generate a video signal from the image signal and transmitting the video signal to the monitor site 32, a tilting unit 26 for tilting the video camera unit 33, a panning unit 27 for panning the video camera 33, a sensor unit 35 for detecting conditional data around the video camera apparatus 31 and sending the conditional data to the microprocessor 17, a counter 16 for counting the number of times of preset operations, and a time measuring circuit 18 for a measuring time interval of the preset operation and generating a time clock signal indicative of the present time.

The video camera unit 33 includes a CCD control circuit 14, an imaging circuit 15 including a CCD imager (not shown) which is driven by the CCD control circuit 14 in response to microprocessor 17, a zoom mechanism 34 for forming the image around the video camera unit 33 on the CCD imager by a zoom lens included in the zoom mechanism 34, a lens motor unit 13 for controlling a zoom ratio and a focus of the zoom lens, a lens motor control circuit 12 for controlling the lens motor unit 13 in response to microprocessor 17, and a limit detector 25 for detecting a limit of the zoom mechanism 34.

The tilting unit 26 includes a tilting mechanism 23 for supporting and tilting the video camera unit 33, a tilt motor 11 for driving the tilting mechanism 23, a tilt motor control circuit 10 for controlling the tilt motor 11 in response to the microprocessor 17, a tilt detector 24 for detecting a tilt angle of the tilt mechanism 23 and sending the tilt angle data to the microprocessor 17.

The panning unit 27 includes a panning mechanism 21 for supporting and panning the video camera unit 33, a pan motor 9 for driving the panning mechanism 23, a pan motor control circuit 8 for controlling the pan motor 9 in response to the microprocessor 17, a pan detector 22 for detecting a pan angle of the pan mechanism 21 and sending the pan angle data to the microprocessor 17.

The sensor unit 35 includes sensors 7 including a thermometer 7a for measuring a temperature inside of a case (not shown) of the video camera apparatus 31, a hygrometer 7b for measuring a humidity inside the case of the video camera apparatus 31, open/close sensors (not shown) for detecting an open/close condition of doors and windows, a human body sensors (not shown), and a sensor control circuit 6 for controlling the sensors 7.

The power supply 2 receives a power from the monitor site when the monitor site 32 is connected to the video camera apparatus 31 with special cables and receives a power under remote control by the monitor site 32 when the monitor site 32 is connected to the video camera apparatus 31 with a network.

The monitor site 32 includes a control terminal 42 for generating and transmitting control data and receives historic data or the like, a data display monitor 43 for displaying historic data and data for monitor controlling operation, and a video display monitor 41 for displaying the video signal from the video signal processing circuit 3.

The EEPROM 5 stores data, such as the historic data and is erasable, so that the data can be rewritten.

A user operates the control terminal 42 to operate the video camera apparatus 31 to effect a preset operation. The preset operation specifies a sequential operation of the video camera apparatus 31. For example, the preset operation specifies that the video camera unit 33 is directed to which angle, or that video camera unit 33 is successively directed to respective doors and windows in a room. The control terminal 42 transmits command data indicative of the preset operation to the microprocessor 17 in communication data. The microprocessor 17 receives the command data indicative of the preset operation through the data communication circuit 1 and stores the command data in the EEPROM 5 at an operation data area.

When the operation by the video camera apparatus 31 is started, the microprocessor 17 measures a running time for an hour or for a day. The running time is stored in the EEPROM 5 as historic data at a data area.

Moreover, if the preset operation is commanded, the microprocessor 17 reads the preset data and controls respective portions of the video camera unit 33 in accordance with the preset data and counts the number of times of the preset operation for an hour or a day, an interval of the preset operation for an hour or a day, and stores the counts and data of the interval in the EEPROM 5 as historic data. Moreover, the number of times and the total interval of the preset operation from the resetting are stored a historic data in the EEPROM 5.

The historic data, such as the number of times and the total interval of the present operation is read and outputted in response to command data indicative of outputting historic data from the control terminal 42. The historic data is displayed on the data display monitor 43 of the monitor site 32. Accordingly, the user can immediately analyze the historic data when a trouble occurs, so that the system can be quickly restored.

Figure 2:
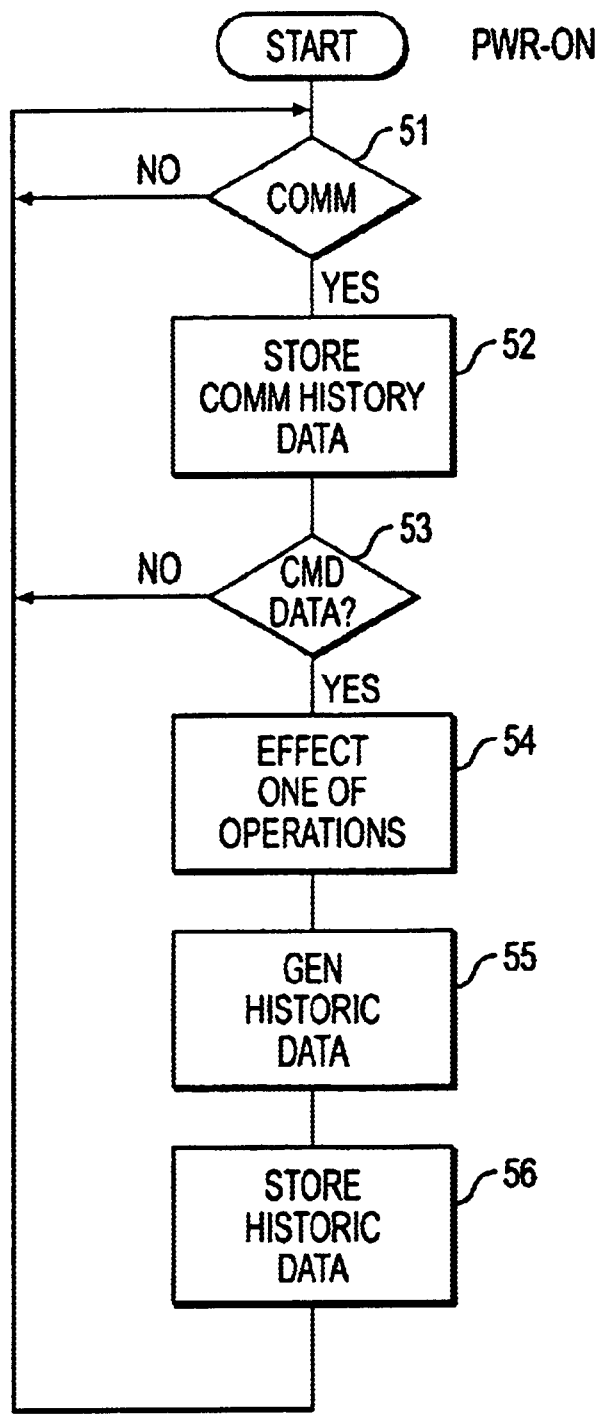
FIG. 2 depicts a flow chart of the operation of the microprocessor shown in FIG. 1.

FIG. 2 depicts a flow chart of the operation of the microprocessor 17 of the embodiment.

The operation is started in response to the power-on. The microprocessor 17 detects whether there is communication with the monitor site 31 in step s1. When there is communication, the microprocessor 17 stores the communication data as historic data together with time data from the time measuring circuit 18 in the EEPROM 5 in step s2. In step s3, if the communication data includes command data, the microprocessor 17 effects one of predetermined operations stored in the EPROM 4 in step s4. In the following step s5, the microprocessor 17 generates historic data indicative of the operation effected in step s4 and stores the historic data in the EEPROM 5 in step s6. Then, processing returns to step S1. When the communication data does not include the command data in step s3, processing returns to step S1.

In steps s5 and s6, the historic data may be selectively generated and stored in response to a command from the monitor site 32.

Figure 3:
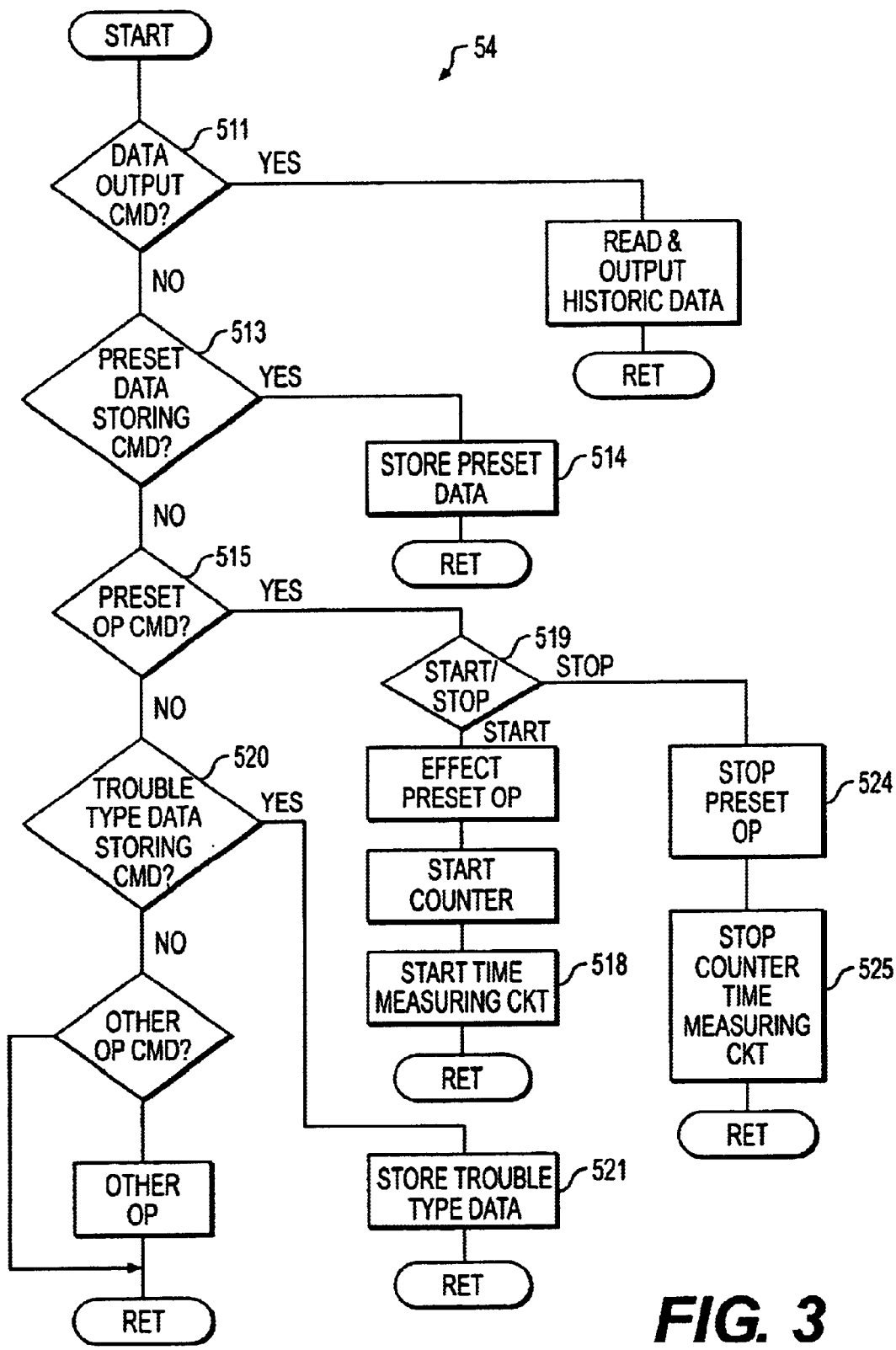
FIG. 3 depicts a flow chart of step s4 shown in FIG. 2.

FIG. 3 depicts a flow chart of step s4 shown in FIG. 2.

The microprocessor 17 checks whether there is preset data storing command data in step s13. If there is a preset data storing command in step s13, the microprocessor 17 stores the preset data in the EEPROM 5 in step s14 as mentioned above and processing returns to the main routine, that is, returns to step s5 in FIG. 2.

In step s15, the microprocessor 17 checks whether there is preset operation command data in step s15. If there is a preset operation command data in step s15, the microprocessor 17 checks the preset operation command data indicates start of the preset operation. If the preset operation command data indicates start of the preset operation, the microprocessor 17 effects the preset operation in accordance with the preset data stored in the EEPROM 5. Then, the microprocessor 17 starts the counter 16 to count the number of times of effected preset operations for a predetermined time interval, such as an hour or a day, that is, a preset operation count POC and a total preset operation count TPOC which is a count of the preset operation from resetting. In the following step s18, the microprocessor 17 starts the time measuring circuit 18 in step s18 to measure the time interval of the preset operation for an hour or a day, that is, a time interval PTI and a total preset operation time interval TPTI. In the flow chart shown in FIG. 3, measuring running time interval mentioned above is omitted. However, the running time interval is also measured as similar to the preset operation. After step s18, processing returns to the main routine.

In step s19, if the preset operation command data indicates stop of preset operation, the microprocessor 17 stops the preset operation in step s24 and stops the counter 16 and the time measuring circuit 18 to stop time measuring the time interval PTI and the total preset operation time interval TPTI in step s25. After step s25, processing returns to the main routine.

Figure 4:
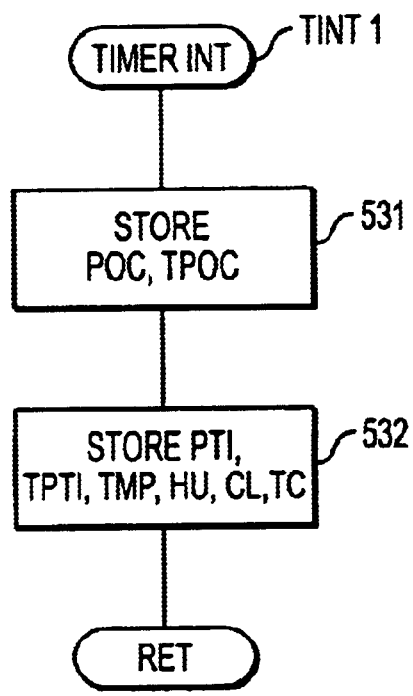
FIG. 4 depicts a flow chart of a timer interruption for the microprocessor shown in FIG. 1.

FIG. 4 depicts a flow chart of a timer interruption TINT1 for the microprocessor 17 of this embodiment.

The microprocessor 17 executes the timer interruption TINT1 every an hour and a day. In response to the timer interruption TINT1, the microprocessor 17 stores the counted preset operation count POC and the total preset count TPOC from the counter 16 as historic data in step s31. In step s32, the microprocessor 17 stores the measured preset time interval PTI, the total preset time interval TPTI in the EEPROM 5 as the historic data from the time measuring circuit 18 in step s32. Moreover, the microprocessor 17 stores the temperature data TMP from the thermometer 7a and humidity data HU from hygrometer 7b in step s32 and processing returns to the main routine. Therefore, historic data every hour and every day is stored in the EEPROM 5.

In FIG. 3, if there is output command data in the communication data in step s11, the microprocessor 17 reads the historic data in the EEPROM 5 and transmits the historic data to the control terminal 42 and the data display monitor 43 in the monitor site 32 through the data communication circuit 1. Moreover, if there is other operation command, such as a manual operation to control the zoom lens mechanism 34, the pan mechanism 21, and the tilt mechanism 23, the microprocessor 17 operates other operations in step s23.

Figure 5:
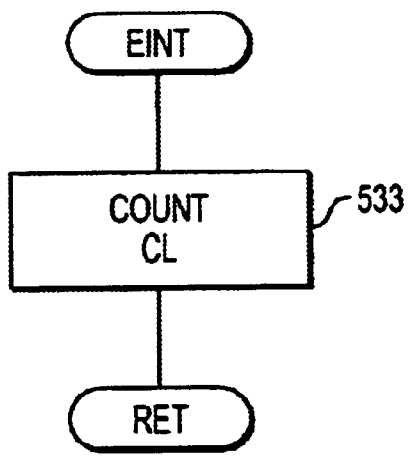
FIG. 5 depicts a flow chart of an event interruption for the microprocessor shown in FIG. 1.

FIG. 5 depicts a flow chart of an event interruption EINT for the microprocessor 17 of this embodiment.

The microprocessor 17 executes the event interruption EINT in response to detecting the limit signal from the zoom lens mechanism 34. That is, the microprocessor 17 counts the number of times of occurrence of the limit signal in step s33. In step s32 in FIG. 4. The microprocessor 17 further stores the count CL in the EEPROM 5.

In step s20 in FIG. 3, if the communication data includes trouble type data storing command data, the microprocessor 17 stores trouble type data in the EEPROM 5 in step s21.

Figure 6:
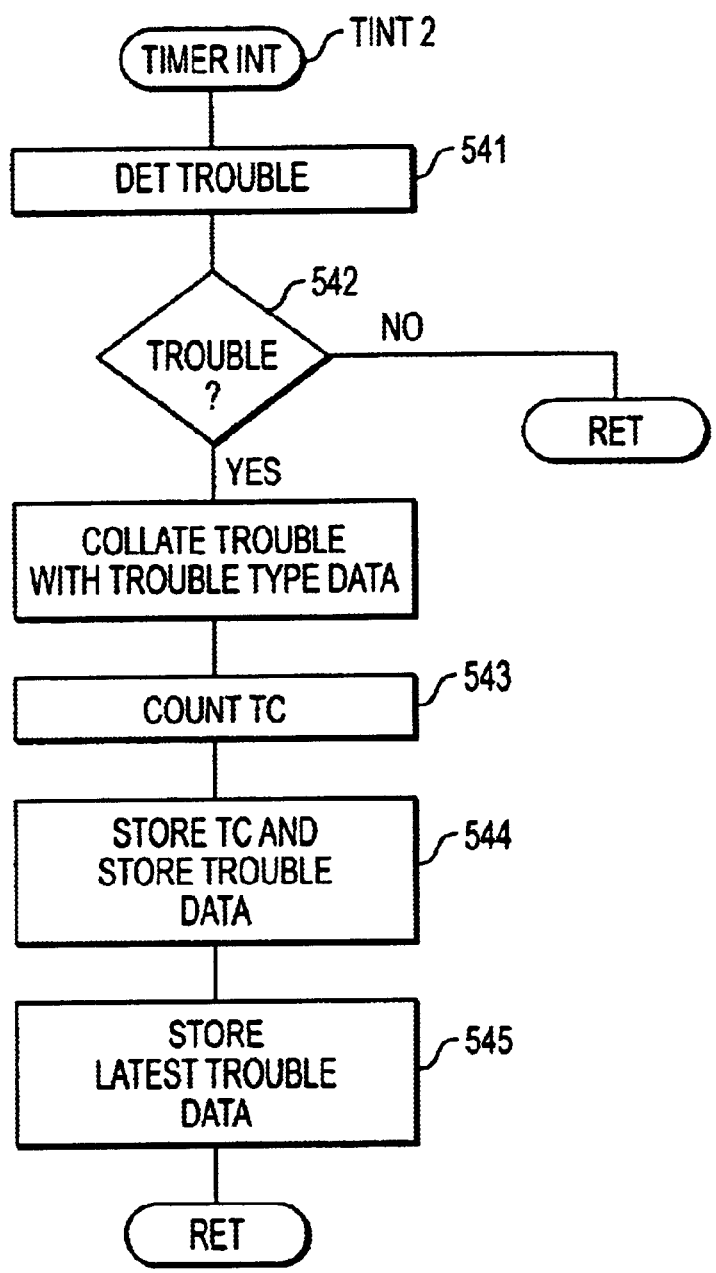
FIG. 6 depicts a flow chart of a timer interruption for the microprocessor shown in FIG. 1.

FIG. 6 depicts a flow chart of a timer interruption TINT2 for the microprocessor 17 of this embodiment.

The microprocessor 17 effects the timer interruption processing every predetermined interval to detect a trouble in the video camera apparatus 31.

In response to the timer interruption TINT2, the microprocessor 17 detects a trouble in the video camera apparatus 31 in step s41 by checking outputs of the limit detection circuit 25, a tilt detector 24, the pan detector 21, and the sensors 7. For example, if the limit detector 25 continuously detects the limit condition though the zoom mechanism 34 is controlled to the opposite limit direction, the tilt detector 24 does not detect variation in the tilt though the tilt motor 11 is driven, or the pan detector 22 does not detect variation in the pan angle though the pan motor 9 is driven. Moreover, if the thermometer 7a detects a not-usual temperature or if the hygrometer 7b detects a not-usual humidity, the microprocessor 17 detects the trouble.

In step s42, if there is no trouble, processing returns to the main routine. In step s42, if there is a trouble, the microprocessor 17 collates (Judges) data of the trouble with the trouble type data for checking correspondence therebetween. In the following step s43, the microprocessor 17 counts the number of times of occurrence of trouble (trouble count) TC in step s43 and stores the trouble count TC and the trouble data every the trouble type data in accordance with the collation result as historic data in the EEPROM 5 in step s44. In the following step s45, the microprocessor 17 stores the latest trouble data in step s45.

The microprocessor 17 stores the trouble count TC every trouble type data, so that the trouble counts TC of every trouble type can be stored and transmitted to the monitoring site 32.

In step s45 in FIG. 6, the video camera apparatus 31 may inform the monitor site 32 of occurrence of the trouble. Moreover, the video camera apparatus 31 may inform the monitor site 32 of the result of the sensor unit 35 in response to the sensor unit 35.

What is claimed is:

1. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

preset operation data storing means for storing preset operation data, said operation means effecting a preset operation in accordance with said preset operation data as said one of predetermined operations; and means responsive to said operation means for counting the number of times of said preset operations, said memory control means storing a count result of said counting means as said historic data.

2. A video camera apparatus according to claim 1, wherein said memory control means stores the count result of said counting means at a predetermined time interval.

3. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

preset operation data storing means for storing preset operation data, said operation means effecting a preset operation in accordance with said preset operation data as said one of predetermined operations; and time measuring means for measuring an interval of said preset operation, said memory control means storing a measurement result of said time measuring means as said historic data.

4. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory, memory control means responsive to said historic data generating means for storing said historic data in said non-volatile memory;

data outputting means for reading said historic data from said non-volatile memory and outputting said historic data in response to a data reading request; and timer means for measuring a predetermined interval, said memory control means storing a measurement result of said timer means as said historic data.

5. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

trouble item data storing means for storing a plurality of trouble item data;

trouble detecting means for detecting trouble occurring with said one of predetermined operations effected by said operation means; and means for judging which of said trouble item data corresponds to the detected trouble, said memory control means storing data on the detected trouble according to trouble item data in accordance with a judgment result of the judging means.

6. A video camera apparatus according to claim 5, further comprising:

means for counting the number of times of occurrence of said trouble; and latest trouble detecting means responsive to said trouble detecting means for detecting the latest trouble, said memory control means storing data on the number of times of said troubles and data on the latest trouble.

7. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

mechanical moving means;

limit detection means for detecting when said mechanical moving portion reaches a limit;

means for counting the number of times when said mechanical moving portion reaches said limit; and timer means for measuring a predetermined interval, said memory control means storing data on the number of times said counting means counts said predetermined interval measured by said timer means.

8. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

means for communicating with an external controller, said memory control means storing data on the communication with said external controller as said historic data.

9. A video camera apparatus comprising:

means for imaging an image around said video camera apparatus, generating a video signal from said image and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and outputting said historic data in response to a data reading request;

temperature measuring means for measuring temperature inside said video camera apparatus; and humidity measuring means for measuring humidity inside said video camera apparatus, said memory control means storing the measured temperature and the measured temperature as said historic data.

10. A video monitor system comprising:

a video camera unit including:

means for imaging a image around said video camera unit, generating a video signal from said image, and outputting said video signal;

operation means responsive to a command signal for effecting one of predetermined operations regarding said imaging means;

historic data generating means responsive to said operation means for generating historic data indicative of said one of predetermined operations;

a non-volatile memory;

memory control means responsive to said historic data generating means for storing said historic data in said non-volatile memory;

data outputting means for reading said historic data from said non-volatile memory and transmitting said historic data in response to a data reading request;

preset operation data storing means for storing preset operation data so that said operation means effects a preset operation in accordance with said preset operation data as said one of predetermined operations; and means responsive to said operation means for counting the number of times said preset operations occur so that said memory control means stores a count result of said counting means as said historic data; and a monitor site including:

a display monitor for displaying said image on the basis of said video signal;

data requesting means for transmitting a request for transmitting said historic data;

data receiving means for receiving said historic data from said video camera unit; and data display means for displaying said historic data from said data receiving means.

* * * * *

UNITED STATES PATENT AND TRADEMARK OFFICE
CERTIFICATE OF CORRECTION

PATENT NO.    : 6,667,764 B1
DATED         : December 23, 2003
INVENTOR(S)   : Koji Wakiyama et al.

It is certified that error appears in the above-identified patent and that said Letters Patent is hereby corrected as shown below:

<u>Title page,</u>
Item [57], ABSTRACT
Line 3, please replace "tie" with -- the --.

Signed and Sealed this

First Day of June, 2004

JON W. DUDAS
*Acting Director of the United States Patent and Trademark Office*